United States Patent
Zhang et al.

(10) Patent No.: US 10,037,137 B2
(45) Date of Patent: Jul. 31, 2018

(54) DIRECTING INPUT OF HANDWRITING STROKES

(71) Applicant: Lenovo (Singapore) Pte. Ltd., Singapore (SG)

(72) Inventors: Jianbang Zhang, Cary, NC (US); Jon Wayne Heim, Durham, NC (US); Russell Speight VanBlon, Raleigh, NC (US); Grigori Zaitsev, Durham, NC (US); Jason Peter Sallinger, Raleigh, NC (US); John Weldon Nicholson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 180 days.

(21) Appl. No.: 14/580,522

(22) Filed: Dec. 23, 2014

(65) Prior Publication Data

US 2016/0179777 A1    Jun. 23, 2016

(51) Int. Cl.
  *G06F 17/00* (2006.01)
  *G06F 3/0488* (2013.01)
  *G06F 17/24* (2006.01)

(52) U.S. Cl.
  CPC ........ *G06F 3/04883* (2013.01); *G06F 17/242* (2013.01)

(58) Field of Classification Search
  CPC ............................ G06F 17/242; G06F 3/04883
  USPC .................................................. 715/263, 268
  See application file for complete search history.

(56) References Cited

U.S. PATENT DOCUMENTS

| | | | | |
|---|---|---|---|---|
| 5,459,796 A | * | 10/1995 | Boyer | G06F 3/04883 345/17 |
| 5,652,806 A | * | 7/1997 | Friend | G06K 9/2054 382/175 |
| 7,266,769 B2 | * | 9/2007 | Thacker | G06F 3/0481 707/999.104 |
| 7,397,950 B2 | * | 7/2008 | Shilman | G06K 9/222 382/103 |
| 7,564,995 B1 | * | 7/2009 | Yaeger | G06F 3/038 382/119 |
| 7,793,233 B1 | * | 9/2010 | Sellers | G06F 17/241 715/780 |
| 9,454,694 B2 | * | 9/2016 | Novak | G06K 9/00402 |

(Continued)

OTHER PUBLICATIONS

Plamondon et al., One-Line and Off-Line Handwriting Recognition: A Comprehensive Survey, IEEE 2000, pp. 63-84.*

(Continued)

*Primary Examiner* — Cong-Lac Huynh
(74) *Attorney, Agent, or Firm* — Ference & Associates LLC (57) ABSTRACT

One embodiment provides a method, including: presenting, on an input and display device, one or more input fields for an underlying application; detecting, using the input and display device, one or more handwriting input strokes provided to an input field overlay application; determining, using a processor, an input field targeting characteristic based on the one or more handwriting input strokes; selecting one of the one or more input fields as a target input field based on the input field targeting characteristic; and inserting a converted form of the one or more handwriting input strokes into the target input field. Other embodiments are described and claimed.

20 Claims, 4 Drawing Sheets

(56) References Cited

U.S. PATENT DOCUMENTS

| | | | | |
|---|---|---|---|---|
| 9,535,508 B2* | 1/2017 | Kang | | G06F 3/04883 |
| 9,633,255 B2* | 4/2017 | Kumar | | G06K 9/00409 |
| 9,639,767 B2* | 5/2017 | Perrin | | G06K 9/2063 |
| 2004/0064787 A1* | 4/2004 | Braun | | G06F 3/03545 |
| | | | | 715/221 |
| 2004/0223637 A1* | 11/2004 | Houle | | G06K 9/00154 |
| | | | | 382/137 |
| 2005/0114773 A1* | 5/2005 | Thacker | | G06F 3/0481 |
| | | | | 715/263 |
| 2005/0135678 A1* | 6/2005 | Wecker | | G06F 3/04883 |
| | | | | 382/186 |
| 2006/0007190 A1* | 1/2006 | Pettiross | | G06F 3/0236 |
| | | | | 345/179 |
| 2006/0159345 A1* | 7/2006 | Clary | | G06K 9/2063 |
| | | | | 382/186 |
| 2006/0262102 A1* | 11/2006 | Lee | | G06F 9/4443 |
| | | | | 345/173 |
| 2008/0235578 A1* | 9/2008 | Heed | | G06F 17/30905 |
| | | | | 715/269 |
| 2009/0161958 A1* | 6/2009 | Markiewicz | | G06F 3/0237 |
| | | | | 382/186 |
| 2009/0285485 A1* | 11/2009 | Sutanto | | G06K 9/00416 |
| | | | | 382/187 |
| 2013/0083074 A1* | 4/2013 | Nurmi | | G06F 3/0488 |
| | | | | 345/650 |
| 2014/0019855 A1* | 1/2014 | Kim | | G06Q 10/10 |
| | | | | 715/268 |
| 2014/0245119 A1* | 8/2014 | Barrus | | G06F 17/243 |
| | | | | 715/224 |
| 2014/0245120 A1* | 8/2014 | Schwartz | | G06K 9/00402 |
| | | | | 715/226 |
| 2014/0351749 A1* | 11/2014 | Wang | | G06F 3/0488 |
| | | | | 715/799 |
| 2015/0205518 A1* | 7/2015 | Strazisar | | G06K 9/00402 |
| | | | | 345/173 |
| 2016/0012315 A1* | 1/2016 | Perrin | | G06K 9/00409 |
| | | | | 382/161 |
| 2016/0042165 A1* | 2/2016 | Nicholson | | G06F 21/32 |
| | | | | 726/19 |
| 2016/0179363 A1* | 6/2016 | VanBlon | | G06F 3/04883 |
| | | | | 715/856 |
| 2016/0179364 A1* | 6/2016 | Nicholson | | G06F 3/04883 |
| | | | | 715/863 |
| 2016/0179764 A1* | 6/2016 | Kelso | | G06F 17/211 |
| | | | | 715/244 |

OTHER PUBLICATIONS

Hu et al., HMM Based On-Line Handwriting Recognition, IEEE 1996, pp. 1039-1045.*

Arica et al., An Overview of Character Recognition Focused on Off-Line Handwriting, IEEE 2001, pp. 216-233.*

Lei et al., Handwritten Character Recognition via Direction String and Nearest Neighbor Matching, Elsevier 2012, pp. 160-165.*

Li et al., Script-Independent Text Line Segmentation in Freestyle Handwritten Documents, IEEE 2008, pp. 1313-1329.*

Kato et al., Handwritten Character Recognition System Using Directional Element Feature and Asymmetric Mahalanobis Distance, IEEE 1999, pp. 258-262.*

* cited by examiner

DIRECTING INPUT OF HANDWRITING STROKES

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box or pane is presented to the user as an overlay, e.g., a rectangle in a lower portion of a touch screen display. In this area the user may provide input handwriting strokes, e.g., letters, numbers, characters, symbols, etc. The device employs software that uses the input handwriting strokes, which are generally presented on screen to provide visual feedback to the user, as input by converting the handwriting stroke input locations on the touch screen into machine text according to the language setting of the device. Alternatively, a graphic or image of unconverted handwriting input may be placed into an underlying application, e.g., an image of the user's signature.

BRIEF SUMMARY

In summary, one aspect provides a method, comprising: presenting, on an input and display device, one or more input fields for an underlying application; detecting, using the input and display device, one or more handwriting input strokes provided to an input field overlay application; determining, using a processor, an input field targeting characteristic based on the one or more handwriting input strokes; selecting one of the one or more input fields as a target input field based on the input field targeting characteristic; and inserting a converted form of the one or more handwriting input strokes into the target input field.

Another aspect provides an electronic device, comprising: an input and display device; a processor; and a memory device that stores instructions executable by the processor to: present, on the input and display device, one or more input fields for an underlying application; detect, using the input and display device, one or more handwriting input strokes provided to an input field overlay application; determine an input field targeting characteristic based on the one or more handwriting input strokes; select one of the one or more input fields as a target input field based on the input field targeting characteristic; and insert a converted form of the one or more handwriting input strokes into the target input field.

A further aspect provides a product, comprising: a storage device having code stored therewith, the code being executable by a processor of an electronic device and comprising: code that presents, on an input and display device, one or more input fields for an underlying application; code that detects, using the input and display device, one or more handwriting input strokes provided to an input field overlay application; code that determines, using a processor, an input field targeting characteristic based on the one or more handwriting input strokes; code that selects one of the one or more input fields as a target input field based on the input field targeting characteristic; and code that inserts a converted form of the one or more handwriting input strokes into the target input field.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Capturing pen input in a field is difficult. Conventionally it requires the user to activate a field. If the input overlay is coincident with the underlying field, additionally the user must start and remain in the provided field with every pen stroke. For example, if the user writes "123 Elm St" into the field, he or she must start in the field for each word or else the pen input will not be captured. This problem gets worse as the length of text gets longer, as it may not fit within the field. Because the user must start in the field each time and then lift the pen to start writing again, it is inconvenient and causes user frustration.

An embodiment enlarges the input field overlay such that the user is not so confined in terms of a static input field. For example, an embodiment may enlarge the field overlay size, e.g., to occupy substantially the entire screen or input area. However, while this allows handwriting input strokes that normally would fall outside of the field to be captured, it may occur that the underlying field into which the user input should be directed is ambiguous.

For example, when writing on top of an underlying application, because the handwritten text size could be larger than text input field's width, and because of the different handwriting styles of users, the handwritten input strokes may cross multiple underlying input fields. Sending the recognized text to the wrong underlying input field results in the user needing to engage in various remedial actions.

Accordingly, an embodiment determines a correct text input field to send recognized text to, e.g., by checking the coordinates of the handwriting input strokes, and their geometric relationship to one another and/or the underlying text input fields. For example, if majority of the handwritten stroke points fall into one underlying input field, an embodiment may send text to that field. As another example, if the first few characters' stroke points fall into or are associated with one underlying input field, an embodiment may send text to that field. Similarly, if a baseline of the handwritten stroke points falls into or is associated with one underlying input field, an embodiment may send text to that input field. Additionally, if the center gravity of the handwritten stroke points falls into or is associated with one input field, an embodiment may send text to that input field.

An embodiment may apply one or several (a combination of) the above techniques to determine the target input field in the underlying application. Each approach may be based on a factor that when used in combination is weighted. For example, a weight may be dynamically adjusted based on the underlying application and/or the underlying input field properties. By way of specific example, for a Microsoft OUTLOOK email window, there are three small input fields at the top, so the baseline method may be given greater weight in determining a target input field for this application or for this sub-part or region of the application. OUTLOOK is a registered trademark of Microsoft Corporation in the United States and other countries.

A weight also may be adjusted based on a user's handwriting style. For example, if a user writes in cursive script rather than block lettering, a center gravity characteristic calculated for the handwritten input strokes and/or a baseline targeting characteristic may be given greater weight in determining a target input field in the underlying application.

The illustrated example embodiments will be best understood by reference to the figures. The following description is intended only by way of example, and simply illustrates certain example embodiments.

Figure 1:
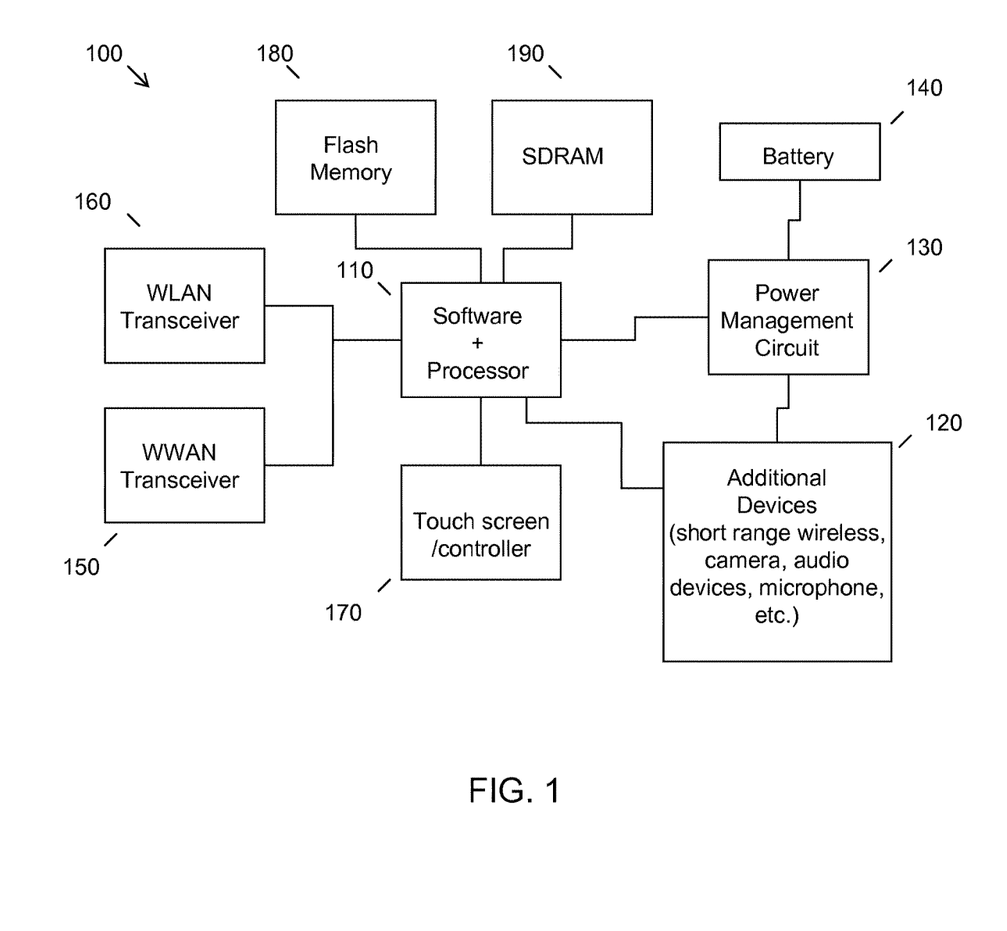
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a camera, short range wireless devices, a microphone, etc. System 100 often includes a touch screen 170 for data input and display/rendering. System 100 also typically includes various memory devices, for example flash memory 180 and SDRAM 190.

Figure 2:
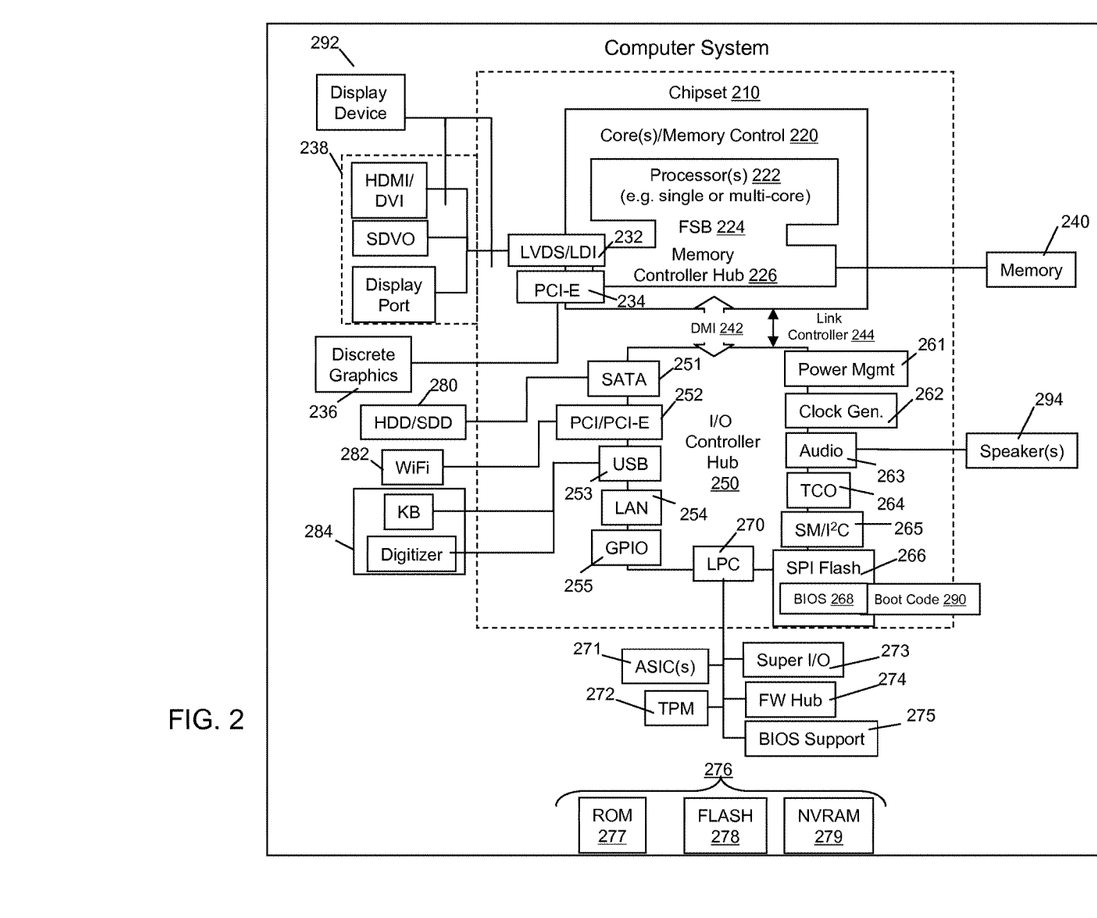
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric input/security devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or other electronic devices such as payment kiosks, etc. Users may employ these devices for various functions, e.g., inputting handwriting strokes as an input modality to an internet search application, an email application, a text messaging or instant messaging application, an e-signature application, with fillable forms, etc. For example, the circuitry outlined in FIG. 1 may be implemented in a tablet or smart phone embodiment, whereas the circuitry outlined in FIG. 2 may be implemented in a laptop personal computer embodiment. In each case, the device may include an input and display device, e.g., a touch screen or the like, which acts to accept handwriting strokes and provides visual displays of input characters, conversions of handwritten characters or strokes to machine text, presentation of an input field overlay and the like.

Figure 3:
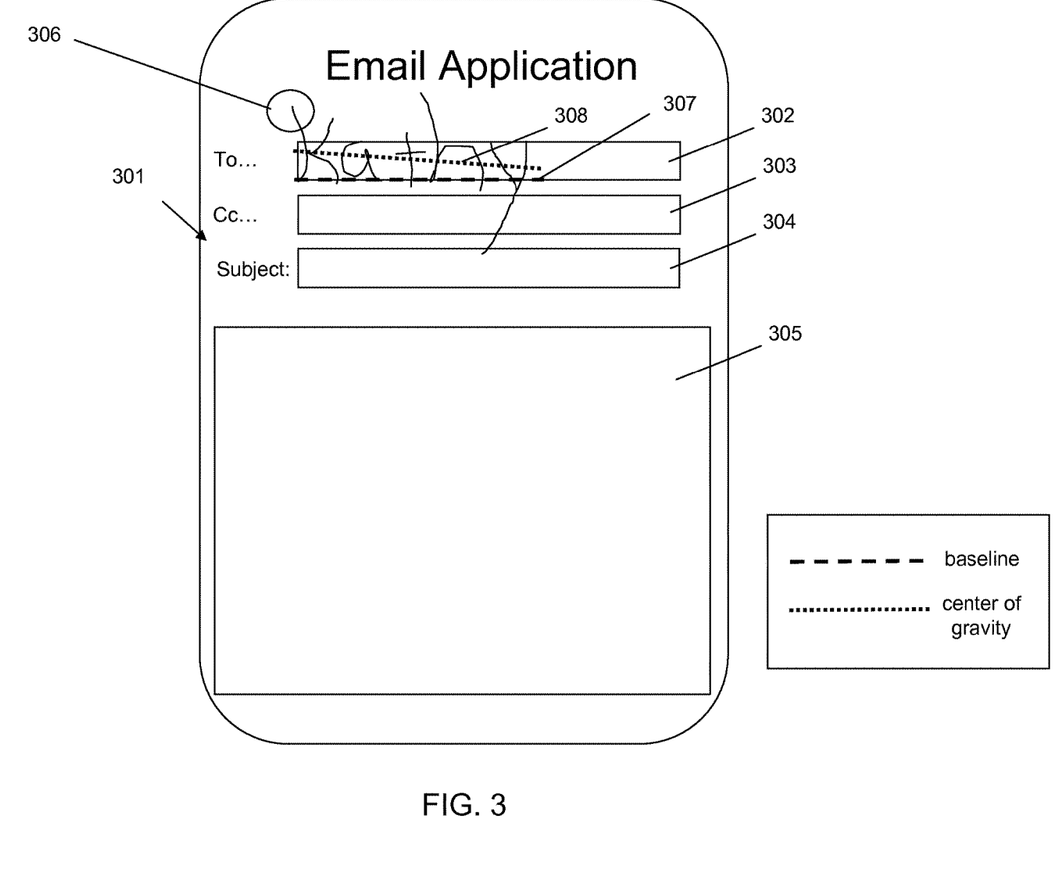
FIG. 3 illustrates an example of input fields and handwriting stroke characteristics.

Referring now to FIG. 3, an example application 301 is illustrated. Here the example application 301 is an email application in which four underlying fields are provided. In the illustrated example, the underlying input fields are a "To" field 302, a "Cc" field 303, a "Subject:" field 304 and a body field 305. A user may wish to provide handwriting inputs to the various fields 302-305, e.g., for conversion of the handwriting into machine input (typeset) and/or for inputting a graphic, e.g., user signature.

An embodiment provides one or more overlay fields. For example, an embodiment may provide an overlay field corresponding to each underlying input field, i.e., 302-305 (which may change size dynamically based on the input) or an embodiment may provide a single, large overlay field that encompasses the entire screen (or nearly so). In an embodiment, the overly field or fields are transparent to the user. The overlay field or fields may be implemented in an overlay input application that acts to collect or receive ink strokes, e.g., handwritten characters provided with a finger tip or pen/stylus, and process these for appropriate input to an underlying application. Generally, the input overlay application is an independent application such that it may run simultaneously and cooperate with a variety of underlying applications. As such, it should be understood that the use of an email application in the illustrated example of FIG. 3 is non-limiting and other underlying applications may be used.

In the example illustrated, a user may opt to input handwriting strokes that are converted by a handwriting recognition engine of the device to machine text, i.e., entered into one of the underlying fields 302-305. However, because an embodiment does not force a user to click, tap on or otherwise activate or focus an underlying field prior to providing handwriting input, directing of the user's handwriting input to a particular field needs to be accomplished.

Here for example the user has written "Kathy" in handwritten letters. As shown, the handwritten letters begin at an initial point 306 that falls outside of the x, y coordinates of any of the underlying input fields 302-305. Thus, the user has not provided an activating or focusing input in this example. An embodiment therefore analyses the location of the input strokes to determine a target underlying field from among 302-305 to which the handwriting input is directed.

An embodiment may utilize a variety of techniques to accomplish this. As described herein, these techniques may be used alone or in some combination. Additionally, the various techniques may be weighted or prioritized based on a number of factors, as further discussed herein.

In one example, if the majority of input stroke points (e.g., points along the handwritten letters "Kathy") fall into (or overlay) a particular underlying input field, here field 302, an embodiment may choose this field to send the input. If the first few stroke points fall into the input field, an embodiment may send the input to that field. In the illustrated example, the user started the input at 306, thus these strokes do not fall into the input field 302. However, an embodiment nonetheless may associate the input with field 302, e.g., as being proximate or closest to that field.

An embodiment may also analyze the input in a collective or more comprehensive manner. By way of example, the input stroke points may be analyzed on by the overlay input application to determine a baseline 307, indicated illustratively as a dashed line underlying or near the calculated baseline of the input characters. This baseline 307 may be used to associate the input with an underlying field. Here, a majority of the base line 307 overlies filed 302, indicating this is the underlying field to which the handwriting input should be sent.

As another example, an embodiment may determine a center of gravity 308 of the handwritten strokes to determine an underlying field into which the input should be sent. As illustrated in FIG. 3, an embodiment may fit a line (e.g., liner fit) to the handwritten stroke points as a center of gravity 308. The center of gravity 308 may then be compared to location coordinates of the underlying input fields 302-305, similar to the baseline 307, to determine if a majority of the calculated center of gravity 308 lies within an underlying input field and/or is associated therewith (e.g., closest to, within a predetermined distance of, etc.).

Figure 4:
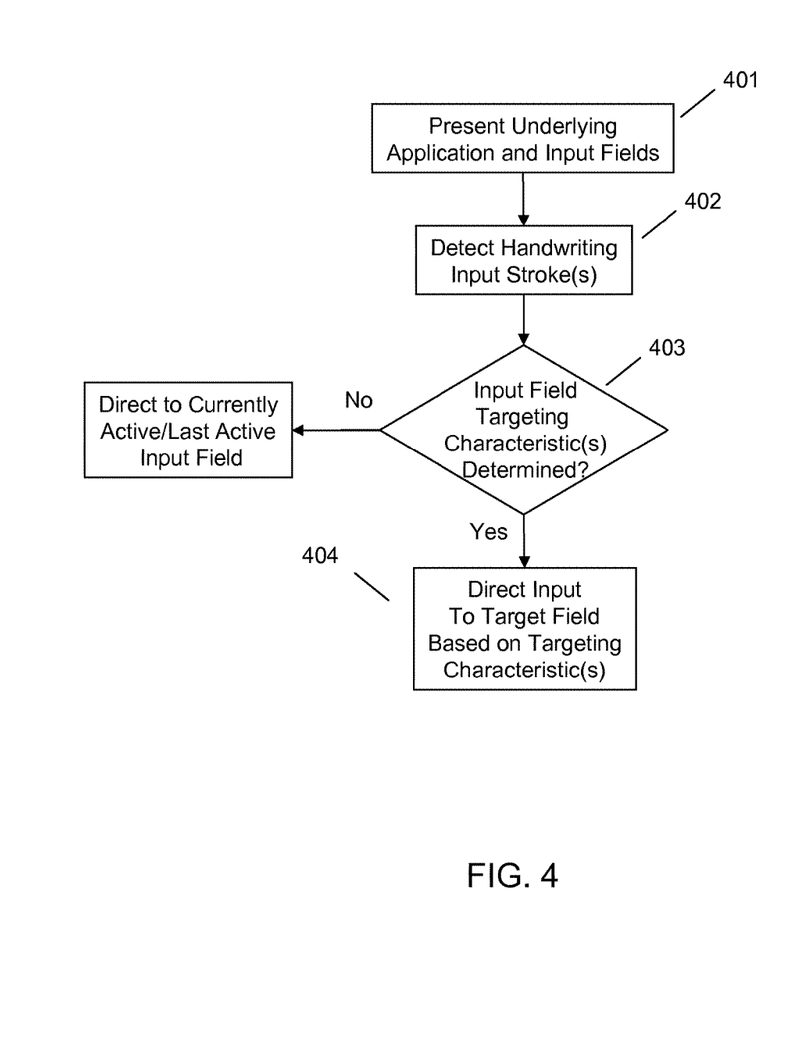
FIG. 4 illustrates an example method of directing input of handwriting strokes.

Referring to FIG. 4, an embodiment may present one or more input fields for an underlying application on a display screen at 401. An embodiment thereafter detects one or more handwriting input strokes provided to an input field overlay application at 402. As described herein, the handwriting input strokes may not neatly map to a given underlying input field. By way of example, as illustrated in FIG. 3 a user's handwritten input strokes may be provided in areas overlying both a first (e.g., 302) and a second (e.g., 303) underlying input field. Moreover, the user may provide handwriting input strokes that fall between two or more underlying input fields, etc. In a context in which the user has not activated a particular underlying input field (e.g., by taping in a field with a pen or stylus), a determination must be made as to which input field, if any, the user input should be directed.

Accordingly, an embodiment examines the location coordinates (e.g., x, y points on a touch screen) of the handwriting input strokes to determine an input field targeting characteristic, e.g., a location of a majority of the handwriting input stroke points associated with an underlying input field location, a location of initial handwriting stroke points associated with an underlying input field, a location of a baseline of the handwriting input strokes associated with an underlying input field, a center of gravity of the handwriting input strokes associated with an underlying input field, or a combination of the foregoing. If a targeting characteristic is determined at 403, an embodiment may utilize this to map or associate the input strokes with an underlying input field. Otherwise, an embodiment may default to inputting the handwriting input into a currently active input field, into a last active input field, into a first input field in the document, disregarding the handwriting input, etc.

Given one or more input field targeting characteristic(s), an embodiment may therefore select one of the underlying input fields as a target input field. This results in an appropriate directing of, e.g., a converted form of the one or more handwriting input strokes into the target input field at 404.

An embodiment is therefore capable of disambiguating a situation where the handwriting input strokes are provided to an overlay application in which an underlying field has yet to be focused. The choice of a target input field within the underlying application may be further assisted via use of a plurality of input field targeting characteristics and weighting thereof. The weighting of at least one input field targeting characteristic may be based on the underlying application. For example, the weighting may be based on the underlying application itself or based on locations of the input fields of the underlying application.

Additionally or in the alternative, the weighting of the at least one input field targeting characteristic may be based on a history of user inputs, such as a writing style, typical baseline for a character or language type, etc. This permits an embodiment to learn and adapt to a particular user's handwriting characteristics, language, writing style, preferred writing implement (pen, stylus, finger) etc.

Additionally or in the alternative, the weighting of the at least one input field targeting characteristic may be based on the initial handwriting angle. Using the first few strokes of a user's handwriting, an embodiment can determine the target input field. This permits an embodiment to learn and adapt on the fly, or in real time to a particular user's current handwriting characteristics.

Given the selection of a target input field, an embodiment may provide an indication of the target input field selected. For example, the indication may include a visual indication provided on the display device prior to inserting input into the target input field. This permits the user an opportunity to confirm the selection or amend it, as the user may not realize that ambiguous handwriting input strokes were provided.

The various example embodiments described herein represent a technical improvement to input devices and handwriting input processing used for handwriting input strokes. Example embodiments have been described that enable a user to provide different types of handwriting input strokes (e.g., increased size, increased duration and content, etc.) that provide the user with substantially more flexibility in use of handwriting input. Handwriting input is often avoided by users because conventional input techniques and devices are cumbersome to use and non-intuitive. Embodiments therefore represent technical improvements to these devices and techniques that will facilitate increased adoption of electronic handwriting as a viable input modality. Moreover, because of the improved input field targeting techniques provided herein, handwriting recognition accuracy, conversion and appropriate field choice for input are improved.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
presenting, on an input and display device, two or more adjacent input fields for an underlying application;
detecting, using the input and display device, one or more handwriting input strokes provided to an input field overlay application, wherein the input field overlay application encompasses the two or more adjacent input fields and wherein at least a portion of the one or more handwriting input strokes are detected outside a boundary of the two or more adjacent input fields;
determining, using a processor, an input field targeting characteristic based on the one or more handwriting input strokes, wherein the input field targeting characteristic identifies one of the two or more adjacent input fields for insertion of the one or more handwriting input strokes;
selecting the identified one of the two or more adjacent input fields as a target input field based on the input field targeting characteristic; and
inserting a converted form of the one or more handwriting input strokes into the target input field.

2. The method of claim 1, wherein the input field targeting characteristic is selected from the group consisting of: a location of a majority of the handwriting input strokes, a location of an initial handwriting stroke, a location of a baseline of the handwriting input strokes, and a center of gravity of the handwriting input strokes.

3. The method of claim 1, wherein the handwriting input strokes are provided to two of the two or more input fields for the underlying application.

4. The method of claim 1, wherein the input field targeting characteristic comprises a plurality of input field targeting characteristics.

5. The method of claim 4, wherein at least one input field targeting characteristic of the plurality of input field targeting characteristics is weighted.

6. The method of claim 5, wherein weighting of the at least one input field targeting characteristic is based on the underlying application.

7. The method of claim 6, wherein weighting of the at least one input field targeting characteristic is based on locations of the one or more input fields of the underlying application.

8. The method of claim 5, wherein the weighting of the at least one input field targeting characteristic is based on a history of user inputs.

9. The method of claim 1, further comprising providing an indication of the target input field.

10. The method of claim 9, wherein the indication is a visual indication provided on the display and input device prior to inserting input into the target input field.

11. An electronic device, comprising:
an input and display device;
a processor; and
a memory device that stores instructions executable by the processor to:
present, on the input and display device, two or more adjacent input fields for an underlying application;
detect, using the input and display device, one or more handwriting input strokes provided to an input field overlay application, wherein the input field overlay application encompasses the two or more adjacent input fields and wherein at least a portion of the one or more handwriting input strokes are detected outside a boundary of the two or more adjacent input fields;
determine an input field targeting characteristic based on the one or more handwriting input strokes, wherein the input field targeting characteristic identifies one of the two or more adjacent input fields for insertion of the one or more handwriting input strokes;
select the identified one of the two or more adjacent input fields as a target input field based on the input field targeting characteristic; and
insert a converted form of the one or more handwriting input strokes into the target input field.

12. The electronic device of claim 11, wherein the input field targeting characteristic is selected from the group consisting of: a location of a majority of the handwriting input strokes, a location of an initial handwriting stroke, a location of a baseline of the handwriting input strokes, and a center of gravity of the handwriting input strokes.

13. The electronic device of claim 11, wherein the handwriting input strokes are provided to two of the two or more input fields for an underlying application.

14. The electronic device of claim 11, wherein the input field targeting characteristic comprises a plurality of input field targeting characteristics.

15. The electronic device of claim 14, wherein at least one input field targeting characteristic of the plurality of input field targeting characteristics is weighted.

16. The electronic device of claim 15, wherein weighting of the at least one input field targeting characteristic is based on the underlying application.

17. The electronic device of claim 16, wherein weighting of the at least one input field targeting characteristic is based on locations of the one or more input fields of the underlying application.

18. The electronic device of claim 15, wherein the weighting of the at least one input field targeting characteristic is based on a history of user inputs.

19. The electronic device of claim 11, wherein the instructions are further executable by the processor to provide an indication of the target input field.

20. A product, comprising:
a storage device having code stored therewith, the code being executable by a processor of an electronic device and comprising:
code that presents, on an input and display device, two or more adjacent input fields for an underlying application;
code that detects, using the input and display device, one or more handwriting input strokes provided to an input field overlay application, wherein the input field overlay application encompasses the two or more adjacent input fields and wherein at least a portion of the one or more handwriting input strokes are detected outside a boundary of the two or more adjacent input fields;
code that determines, using a processor, an input field targeting characteristic based on the one or more handwriting input strokes, wherein the input field targeting characteristic identifies one of the two or more adjacent input fields for insertion of the one or more handwriting input strokes;
code that selects the identified one of the two or more adjacent input fields as a target input field based on the input field targeting characteristic; and code that inserts a converted form of the one or more handwriting input strokes into the target input field.

\* \* \* \* \*